July 26, 1955 R. J. BRODERICK 2,714,193
RESONANT CAVITY ATTENUATOR
Filed July 14, 1953 3 Sheets-Sheet 1

RICHARD J. BRODERICK
INVENTOR.

BY *Edgar O. Rost*

ATTORNEY

July 26, 1955   R. J. BRODERICK   2,714,193
RESONANT CAVITY ATTENUATOR
Filed July 14, 1953   3 Sheets-Sheet 2

RICHARD J. BRODERICK
INVENTOR.
BY Edgar O. Rost
ATTORNEY

July 26, 1955 R. J. BRODERICK 2,714,193
RESONANT CAVITY ATTENUATOR
Filed July 14, 1953 3 Sheets-Sheet 3

RICHARD J. BRODERICK
INVENTOR.
BY Edgar O. Rost
ATTORNEY

1

United States Patent Office 2,714,193
Patented July 26, 1955

2

2,714,193

RESONANT CAVITY ATTENUATOR

Richard J. Broderick, Beverly, Mass., assignor to Bomac Laboratories Inc., Beverly, Mass., a corporation of Massachusetts Application July 14, 1953, Serial No. 367,938

5 Claims. (Cl. 333—98)

The present invention relates to radio direction and ranging systems and more specifically to a device for the protection of a radio receiver operative at microwave frequencies to control guided missiles.

Radio direction and ranging systems (radar) have found wide application in the field of guided missiles. Generally, an antenna and sensitive radio receiver are mounted in the missile, while the transmitter is located on the ground. The radio receiver has a crystal detector and amplifier capable of receiving low power radar signals while the missile is in flight. Since the received power varies inversely as the square of the distance from the transmitter, it is necessary that a high power signal be transmitted. At the time of launching, while the missile is in the vicinity of the high power transmitter, the sensitive detector may become permanently impaired, as by "burnout" or deterioration of the crystal element. It is necessary, therefore, to provide suitable protection at this time, and further, to remove this protection when the strength of the signal reaches a safe value so as to permit control of the missile in flight.

Various electrical and mechanical devices may be found in the art to attenuate the strong radar signals. Examples of such devices are disclosed in Patents No. 2,570,814, issued October 9, 1951, to W. A. Joerndt, and 2,570,813, issued October 9, 1951, to W. A. Joerndt and Roland Larson. These attenuators provided for the automatic removal of the attenuation at a predetermined distance from the launching point. However, since the removal means are rather elaborate and costly to provide, it is desirable in certain missile applications to provide a very simple and inexpensive attenuator. A novel attenuator disclosed in co-pending application, Serial No. 355,128, filed May 14, 1953, by Harold Heins provides a resonant cavity with the attenuating element extending across said cavity. Upon removal of the attenuation, the device becomes a tuned transmission device to pass only radar signals of a selected frequency. This enhances control of the missile and further protects the radar receiver from stray energy radiation. Tuning of the resonant cavity before launching is possible, and attenuation may be provided for systems operating over a selected frequency band.

It is an object of the present invention to provide a simple and efficient radar signal attenuator suitable for protection of the sensitive radio receiver in a guided missile from high power signal energy.

A further object is to provide novel means for removal of the attenuation at a predetermined time after launching of the guided missile.

A still further object is to provide in a radar signal attenuator, resonant at a selected frequency range of operation, novel means for automatically removing the attenuation, said means having no moving parts, at a substantial saving in manufacturing costs.

The present invention attains the objects enumerated above and retains the advantages of the resonant cavity type attenuator by providing a continuous short circuit across the resonant cavity to thereby introduce a high impedance and attenuate the incoming radar signals. The selected element designed to short circuit the system is a strip of highly vaporisable metal or alloy thereof. After launching of the missile a preset time delay switch, which may be coupled to the electrical system in the missile, closes a circuit and automatically causes the current to flow through the attenuating element. Since the selected material will not withstand high heat, it will automatically disintegrate or literally "blow out." Removal of the short circuit in the resonant cavity allows radar signals of the resonant frequency to pass to the radio receiver to control the missile from a remote point. Cost of manufacture of the attenuating device is inexpensive since there are no elaborate spring-actuated or electrically operated mechanisms to remove attenuation. Further, the element of my invention may be permanently positioned within the device and does not depend upon mechanical devices to assure that the attenuation is present when needed. This eliminates the possibility of mechanical failure during launching and the resultant loss of control by deterioration of the receiver crystal.

The objects, features, and advantages will be more readily appreciated after consideration of the following detailed specification and accompanying drawings, in which.

Figure 1:
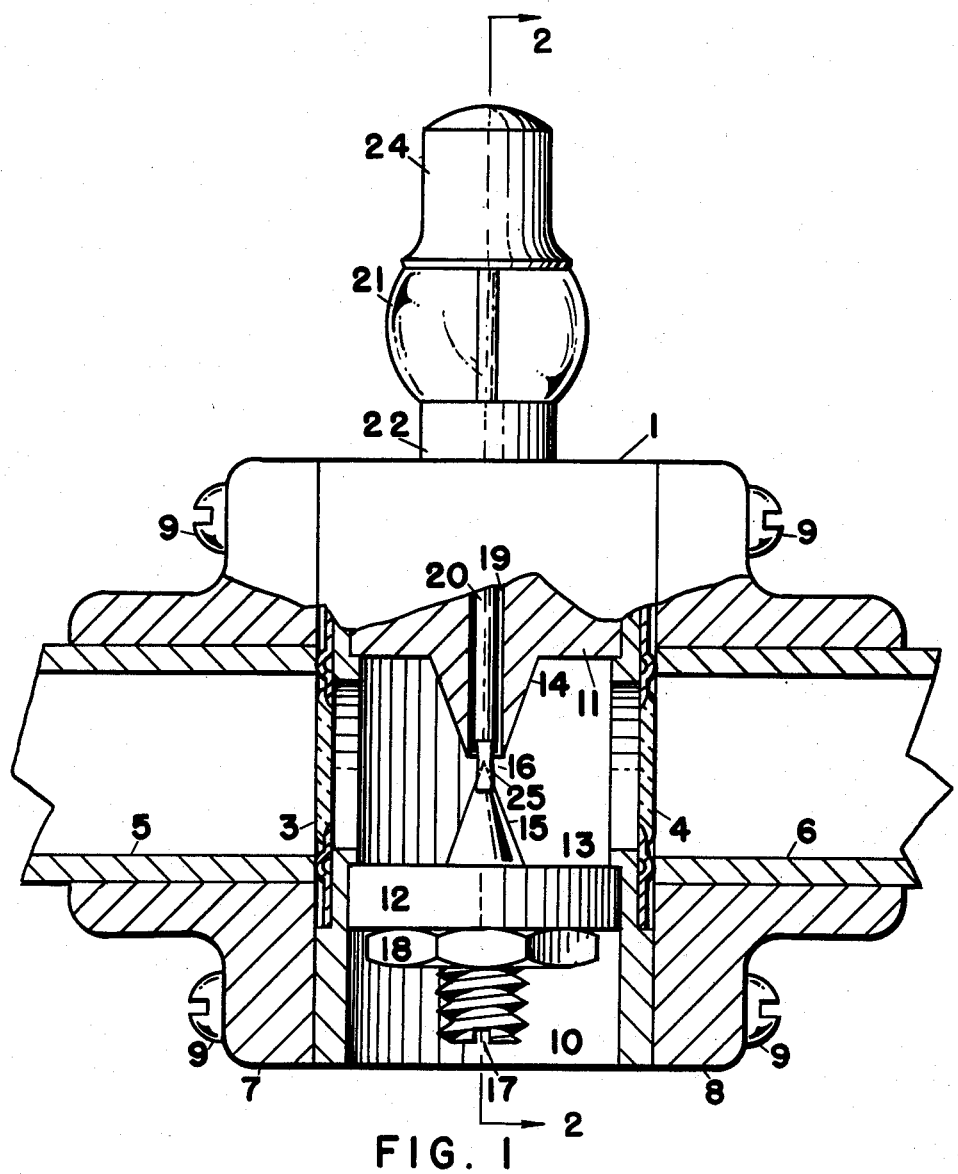
Figure 1 is a side elevation, partly in section, of an illustrative embodiment mounted in wave guide structure.
Figure 2:
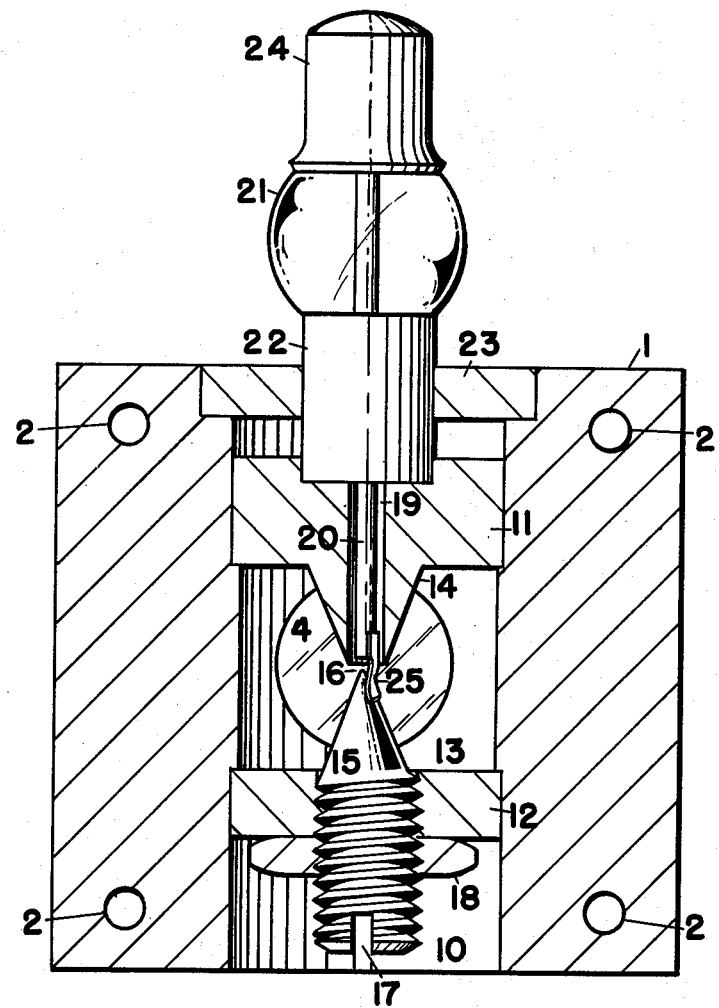
Figure 2 is a enlarged vertical cross section along the line 2—2 in Figure 1.

As shown in the drawings, I provide a metallic housing 1 with tapped holes 2 suitable for mounting the device in rectangular wave guide structure, commonly employed in microwave radar systems. A pair of centrally located resonant apertures with a dielectric enclosure 3 and 4 provide for the passage of electromagnetic wave energy.

Figure 1 illustrates the method of mounting the device in wave guide structure. Sections of rectangular standard wave guide 5 and 6 have secured thereto coupling flanges 7 and 8 which are aligned with mounting holes 2. The device may be secured to the flanges by means of screws 9.

Housing 1 has an axial passage 10 therethrough. Spaced members 11 and 12 are hermetically sealed within said passage. The spacing of said members is critical since they form the wall structure of the resonant cavity 13 with the dimensions determined by the selected frequency of operation. Member 11 has a substantially frusto-conical section 14 extending into cavity 13. Spacing member 12 has an axially adjustable conical tuning screw 15 extending therethrough into the cavity 13 and is oppositely disposed from cone 14. A gap 16 is provided between the cones, and the distance is adjusted by means of a screw driver inserted in slot 17. Retaining nut 18 maintains the positioning after tuning to the resonant frequency.

An axial passage 19 extends through member 11 and provides means for the introduction of a rod or wire electrode 20 of a conductive metal. The end of said electrode extends to the apex of cone 14, or may be withdrawn a short distance from the apex to prevent the introduction of undesired attenuation. Electrode 20 is supported in its desired position by a glass bead 21 hermetically sealed to sleeve 22 of a metal suitable for a glass to metal seal such as Kovar. Sleeve 22 is vacuum sealed to member 11, as by soldering or brazing. To insulate electrode 20 from the housing 1, I provide a ring 23 of an insulating material, desirably teflon or micarta, at the outer end of passage 10. The external end of electrode 20 is provided with a top cap 24 for connection to the electrical circuit means sufficient to remove the attenuating element at the desired time.

Figure 3:
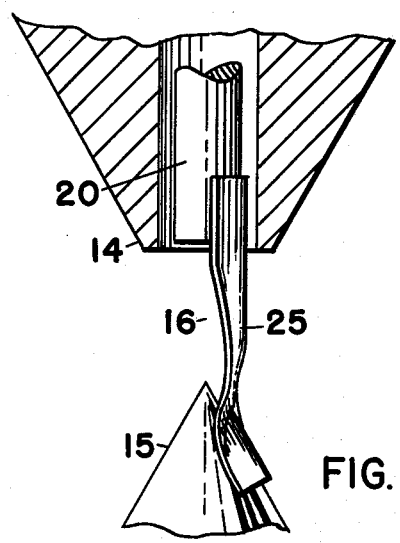
Figure 3 is an enlarged perspective view of the electrode structure of the illustrative embodiment.

Extending across the gap 16 and short-circuiting cones 14 and 15, as shown in Figure 3 is a short length of wire or ribbon 25, electrically connected to electrode 20 and cone 15. The wire or ribbon may be selected from a group of highly vaporisable metals, such as magnesium, magnesium base alloys, aluminum or aluminum base alloys.

Radar signals will be attenuated by the short circuit across the gap. Removal of this attenuating element by a voltage potential sufficient to completely vaporise the metal will permit radar signals to pass through the gap to the receiver. To further insure the vaporisation of the metal, the assembled device may be evacuated and filled with an atmosphere of oxygen at slightly less than atmospheric pressure according to the methods commonly employed in the art.

Figure 4:
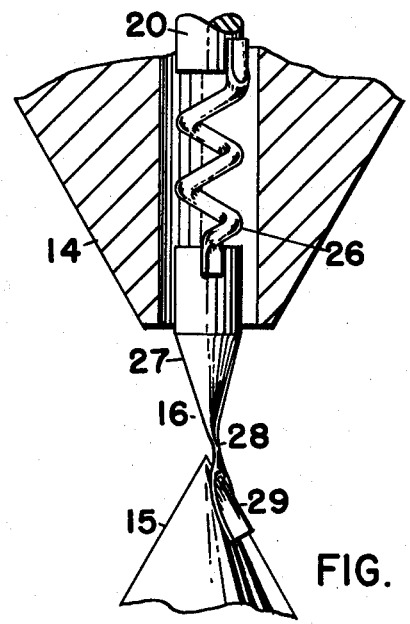
Figure 4 is a perspective view of alternate electrode structure for the positioning of the attenuating element.

In Figure 4 is shown an alternative embodiment of the present invention. To provide for a faster removal of attenuation across gap 16, electrode 20 is positioned a substantial distance from the apex of cone 14. Attached thereto is a spring 26 having one leg attached to the strip of vaporizable metal 27. A portion of said strip 27 is crimped or otherwise notched as at 28 to form a point of low resistance desirably near the tip of cone 15. Spring 26 is tensioned and strip 27 is electrically connected to cone 15, as shown at 29.

A suitable voltage potential when applied to electrode 20 will cause strip 27 to separate at its point of low resistance 28. Since spring 26 is under tension the separation of the strip 27 will cause the spring to withdraw the parted strip from its position, short circuiting the gap 16. This embodiment will provide for removal of the attenuation more speedily because of the action of spring 26.

While the invention has been described in several embodiments, other variations and modifications, such as the method of attaching the attenuating element to the conical electrode, will occur to those skilled in the art. It is, therefore, my intent to cover such modifications and variations as fall within the spirit and scope of the invention as set forth in the appended claims.

I claim:

1. A radar signal attenuator for use in protecting a radio receiver comprising a metallic housing having a resonant cavity therein, a pair of conical electrode members with opposed convergent ends in axial alignment within said resonant cavity defining a gap, at least one of said conical electrode members being hollow, a third electrode extending into said hollow electrode member, a strip of a metal of the group consisting of magnesium, magnesium base alloys, aluminum and aluminum base alloys having one end attached to said third electrode, said strip extending co-axially across said gap with its other end attached to the opposed conical electrode member.

2. A resonant cavity attenuator comprising a metallic housing with means for mounting in wave guide structure, an axial passage therethrough, a pair of spaced conical electrodes disposed in axial alignment within said axial passage to form a resonant cavity, at least one of said electrodes having a hollow passage, a third electrode extending into said hollow conical electrode, the inner end of said third electrode terminating at approximately the apex of said hollow conical electrode, means for attenuation of radar signals electrically connected to said inner end comprising a length of a vaporisable metal disposed co-axially within said resonant cavity to engage the opposite conical electrode, said contacting end of said length of vaporisable metal being electrically connected to said opposite conical electrode.

3. A resonant cavity attenuator comprising a metallic housing adapted for mounting in wave guide structure, an axial passage therethrough, a pair of spaced wall members forming a resonant cavity within said axial passage, said wall members having intermediate opposed conical convergent ends in axial alignment defining a gap, at least one of said wall members having a hollow passage, a metallic rod extending into said hollow passage, the end of said rod terminating at approximately the apex of said hollow wall member, a strip of a vaporisable metal electrically connected to said end of said rod, said strip extending co-axially across said gap to contact the opposed conical wall member, said strip being electrically connected to said contacted opposed conical wall member.

4. A resonant cavity attenuator comprising a metallic housing adapted for mounting in wave guide structure, an axial passage therethrough, a pair of spaced wall members forming a resonant cavity within said axial passage, said wall members having intermediate opposed conical convergent ends in axial alignment defining a gap, at least one of said wall members having a hollow passage, a metallic rod extending into said hollow passage, a spring having one leg attached to said rod, a strip of a vaporisable metal electrically connected to the other leg of said spring, said strip extending coaxially across said gap to contact the opposed conical wall member, said strip having a reduced portion in proximity to the point of contact, said spring being tensioned and having its tension maintained by being electrically connected to said contacted opposed conical wall member at the point of contact.

5. A radar signal attenuator comprising a metallic housing having a resonant cavity therein, a pair of opposed conical electrodes defining a gap within said resonant cavity, at least one of said conical electrodes being hollow, a conductive wire electrode extending outside said metallic housing and inwardly into said hollow conical electrode to a point adjacent said gap, a metallic element of a vaporisable metal spanning said gap having one end electrically connected to the inner end of said conductive wire and the other end electrically connected to the opposed conical electrode.

References Cited in the file of this patent

UNITED STATES PATENTS

| 2,462,369 | Drake et al. | Feb. 22, 1949 |
| 2,668,276 | Schooley | Feb. 2, 1954 |